Aug. 24, 1965         H. A. FLYNN ETAL         3,202,963
                APPARATUS FOR ILLUMINATING POWER LINES
Filed Dec. 13, 1960                            4 Sheets-Sheet 1

INVENTORS
Howard A. Flynn
George W. Shoemaker
BY Wills & St. John
       attys.

INVENTORS.
Howard A. Flynn
George W. Shoemaker
By Wills & St. John
attys.

Aug. 24, 1965  H. A. FLYNN ETAL  3,202,963
APPARATUS FOR ILLUMINATING POWER LINES
Filed Dec. 13, 1960  4 Sheets-Sheet 3

INVENTORS
Howard A. Flynn
George W. Shoemaker
BY Wells & St. John
attys.

Aug. 24, 1965   H. A. FLYNN ETAL   3,202,963
APPARATUS FOR ILLUMINATING POWER LINES
Filed Dec. 13, 1960   4 Sheets-Sheet 4

INVENTORS
Howard A. Flynn
George W. Shoemaker
BY Wells & St. John
Attys.

United States Patent Office 3,202,963
Patented Aug. 24, 1965

3,202,963
APPARATUS FOR ILLUMINATING POWER LINES
Howard A. Flynn, E. 812 Nora, and George W. Shoemaker, E. 735 23rd, both of Spokane, Wash.
Filed Dec. 13, 1960, Ser. No. 75,522
4 Claims. (Cl. 340—28)

This invention relates to an apparatus for illuminating power lines so as to designate the position of the lines between towers.

Modern transmission lines are strung between towers which are growing increasingly in height as the transmission voltages are increased. This poses safety problems, since the lines are often suspended in areas close to air lanes. In order to visibly indicate the position of such lines, the present invention proposes the use of a flashing lamp unit suspended freely upon the lines so as to add no stress to the lines. In this manner the location of the power lines will be accurately defined under most weather conditions.

It is an object of this invention to provide a flashing lamp which can be hung on a transmission line and which derives power through a current transformer, utilizing the current of the transmission line as a primary coil source. This allows transfer of a small amount of energy from the line to the lamp without direct electrical contact. It also eliminates the need for batteries or other sources of electrical energy.

It is another object of the invention to utilize the desirable qualities of a plastic outer globe to lead light to the globe flanges, so as to provide a lighted circumferential area visible from any direction.

It is another object to design a lamp housing having symmetry and lamp visibility from all angles of vision. The housing is also compact, light and easily disassembled.

These and further objects will be obvious from a study of the following detailed description of one embodiment of the invention. This embodiment is for illustrative purposes and is not intended to limit the extent of the invention as defined by the concluding claims.

Figure 1:
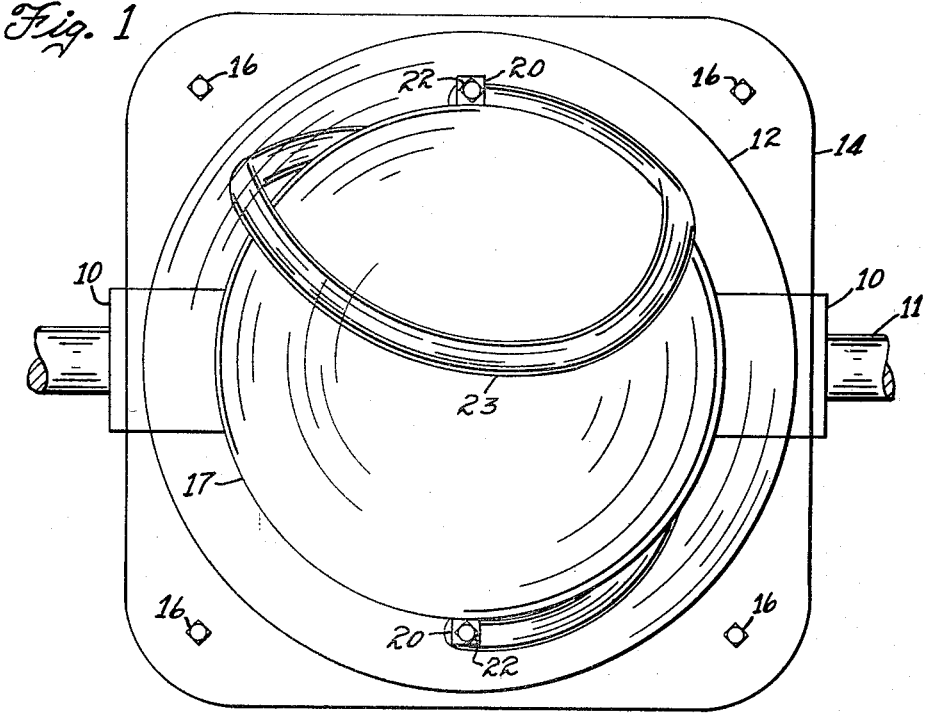
Figure 2:
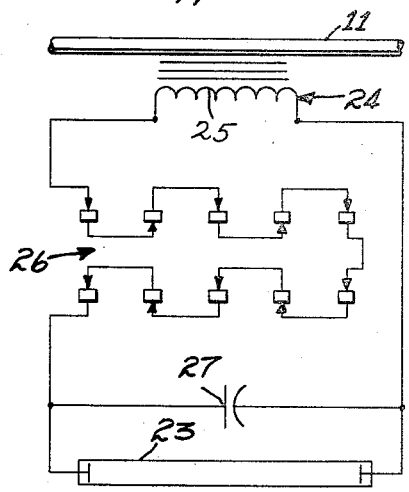
Figure 3:
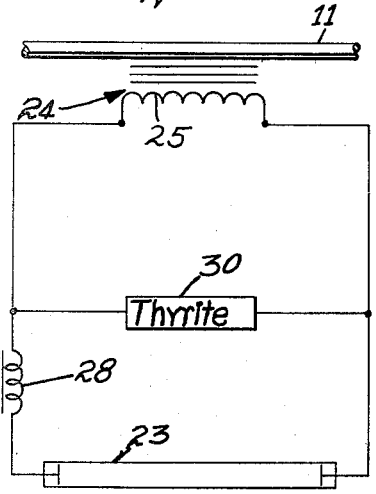
Figure 4:
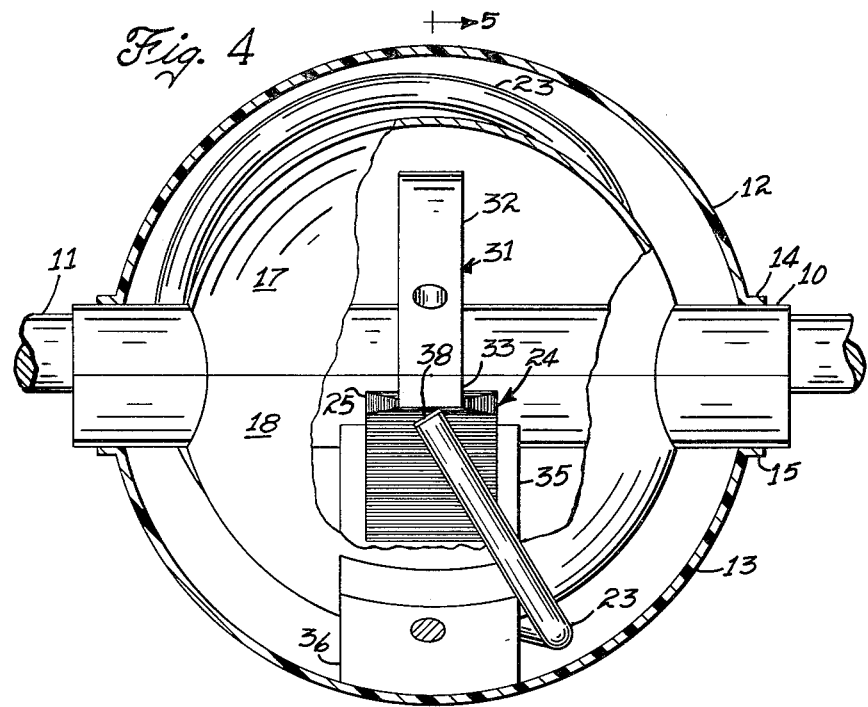
Figure 5:
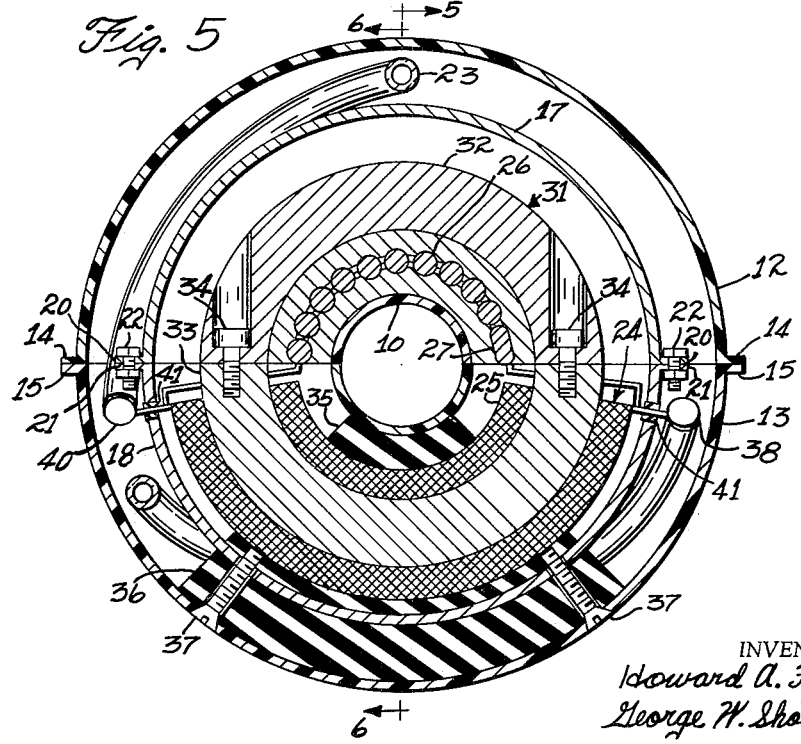
Figure 7:
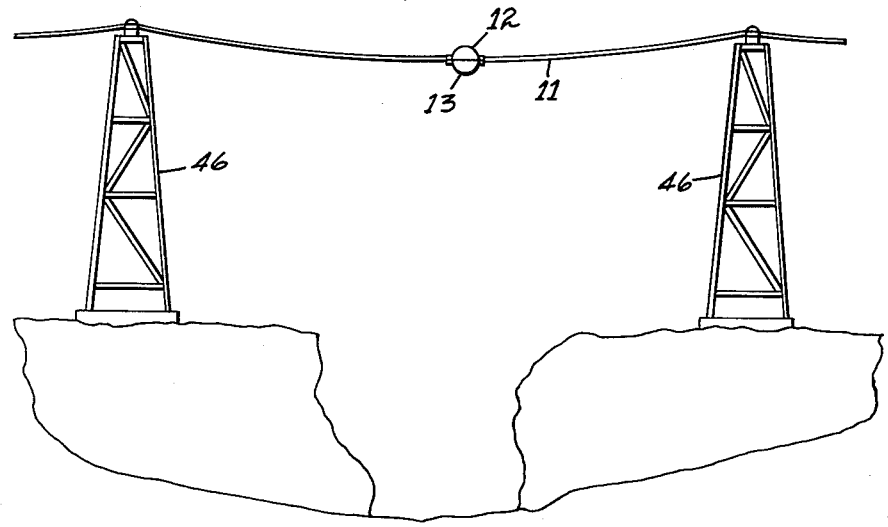
Figure 6:
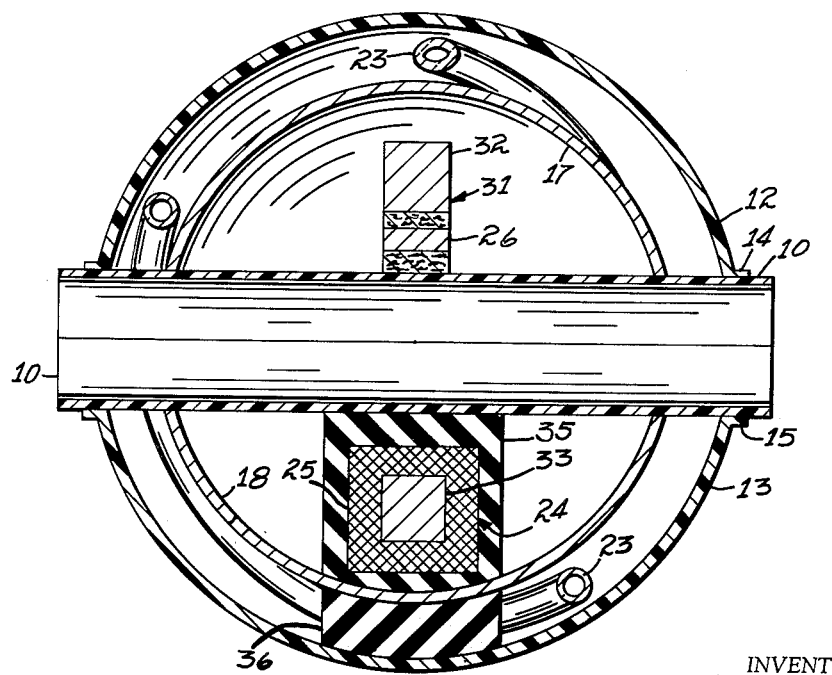
Figure 8:
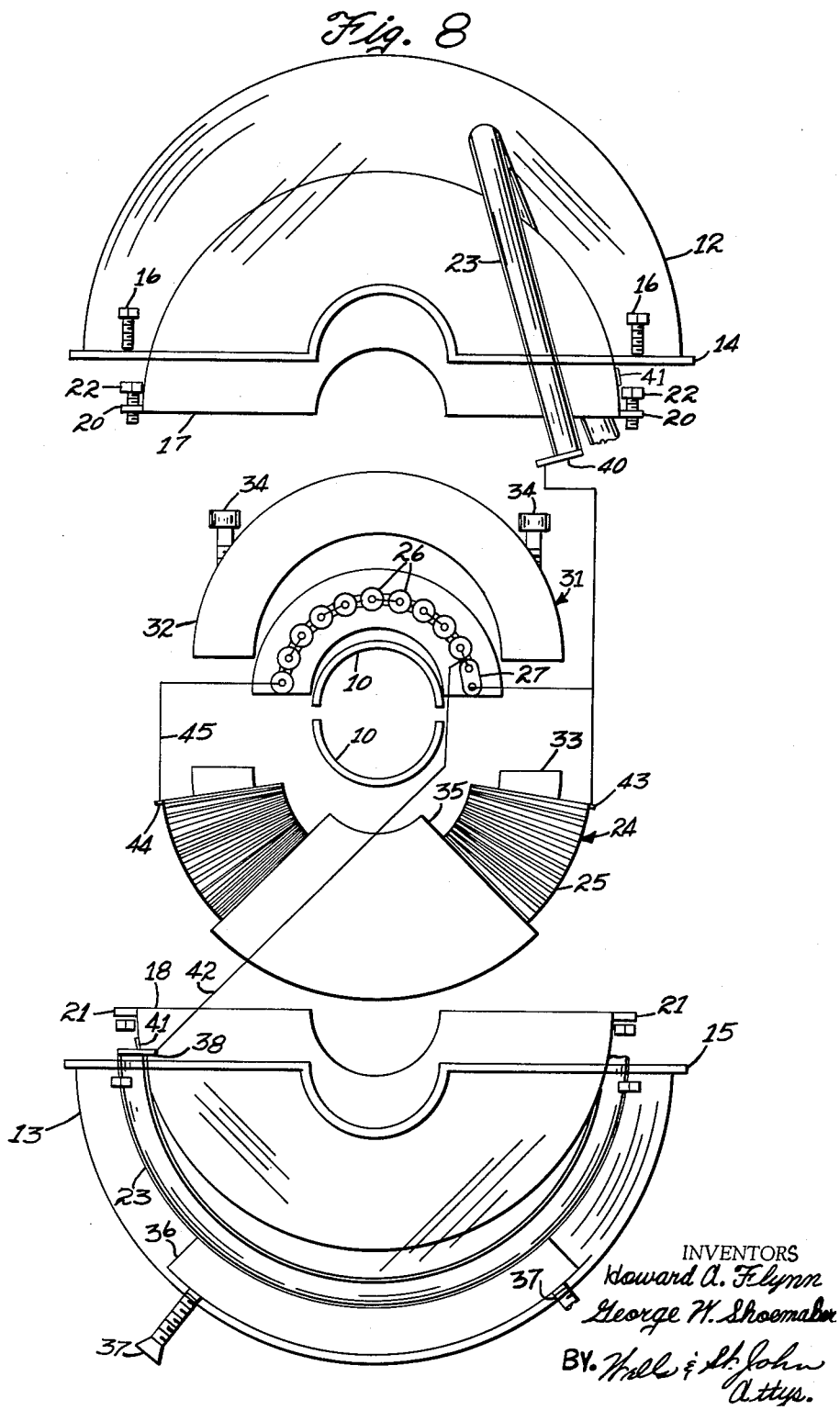

In the drawings:
FIGURE 1 is a top view of a lamp unit suspended on a transmission line;
FIGURE 2 is a wiring diagram of a first lamp circuit;
FIGURE 3 is a wiring diagram of a second lamp circuit;
FIGURE 4 is a front view of a lamp unit with portions of the outer globe and cover broken away;
FIGURE 5 is a vertical sectional view taken along line 5—5 in FIGURE 4;
FIGURE 6 is a vertical sectional view taken along line 6—6 in FIGURE 5;
FIGURE 7 is an elevational view of the warning lamps as installed on a high voltage transmission line; and
FIGURE 8 is an exploded view of the assembly, shown in vertical elevation.

The apparatus disclosed herein is primarily designed to illuminate high voltage electric transmission lines, such as those lines which are strung between a primary source of power and central distribution centers. It may also be used on consumer lines where positive indication of the line position is desirable, such as in the vicinity of an airfield. The overall apparatus, seen in FIGURE 1, consists of a split central mounting tube 10 which receives the transmission line 11. Clamped over tube 10 is an outer globe consisting of two hemispherical sections 12, 13 which are formed with radial flanges 14, 15 respectively. The flanges 14, 15 are secured together by bolts 16. The tube 10 is of a greater inside diameter than the outer diameter of line 11. Thus the lamp apparatus is freely mounted to slide on line 11 and will rest at the lowest point on the line 11 without stressing the line 11.

Mounted within the globe sections 12, 13 is a concentric reflective cover formed of two hemispherical sections 17, 18 having radial tabs 20, 21 respectively which are joined by bolts 22. A gaseous conduction lamp 23 is mounted between the cover sections 17, 18 and globe sections 12, 13. The lamp 23 is fashioned so as to wrap around cover sections 17, 18 and so as to be partially visible from every angle.

The cover sections 17, 18 are made of metal or other suitable material having a bright, reflective outside surface. The globe sections 12, 13 are molded of plastic, preferably a material such as Lucite, which can lead light to the outer peripheries of flanges 14, 15 to thereby produce a bright circumferential line of light about the entire apparatus when lamp 23 is lighted. Sections 12, 13 may be colored red or any other desirable color. In this case the lamp 23 would be chosen so as to yield white light. If a clear plastic is utilized in globe sections 12, 13 a colored lamp 23 may be used to produce similar results.

The circuit used to intermittently cause lamp 23 to conduct, and thereby produce visible light, is shown in two alternative diagrams in FIGURES 2 and 3. Current is utilized from a split core current transformer 24 which uses line 11 as a primary winding. This is a step-up current transformer and requires a very minute amount of current from line 11 for proper operation. The transformer 24 is identical in both circuits shown in FIGURES 2 and 3.

As shown in FIGURE 2, the lamp 23, which is a gaseous conduction lamp of known manufacture and filled with a gas such as neon, is wired across the secondary winding 25 in series with a rectifier unit 26. The unit 26 is merely a plurality of small rectifiers wired together in series. The use of a plurality of rectifiers is prompted by space considerations. The lamp 23 has wired across its terminals a suitable capacitor 27. The sizes and limit values of the electrical units in this assembly must be varied to meet the demands of each installation. The choice of components is believed to be within the skill of those who might use this invention.

In operation, the rectifier unit 26 converts the alternating current in secondary winding 25 to a direct current. This direct current is used to charge capacitor 27. When the voltage across capacitor 27 reaches the discharge voltage required by lamp 23, lamp 23 will fire and shunt the capacitor 27. This firing action will be very brief. Thus the intermittent flashing of lamp 23 is accomplished by successively charging and discharging capacitor 27.

The second form of the invention is shown in FIGURE 3. In this case, lamp 23 is wired across the terminals of secondary winding 25 in series with a choke coil 28. Also wired across the terminals of secondary winding 25 is a resistor 30 made of thyrite, a material having a current conducting capacity which varies exponentially as a function of the voltage applied across its terminals. The resistor 30 is used as a shorting device. The voltage across the secondary winding 25 is sufficient to enable lamp 23 to become conductive.

As lamp 23 becomes conductive, coil 28 limits the current due to its inductance. This current is shunted by resistor 30, which can accommodate more current as the voltage across it increases. This accommodation increases exponentially until the voltage across resistor 30 is in excess of the voltage required to fire lamp 23. Lamp 23 will go out, and voltage will again build up across the lamp terminals until lamp 23 lights again. This repetitive process will result in a constant flickering of lamp 23.

The particular lamp arrangement is shown in FIGURES 4–6 and 8. The tube 10, globe sections 12, 13, cover sections 17, 18 and lamp 23 have been discussed. Mounted concentrically about the insulating tube 10 is the core 31 of split core transformer 24. Core 31 has two sections, 32, 33 which are joined by screws 34 and which are made of suitable core material. The secondary winding 25 is wound about section 33 and is covered by an arcuate insulating spacer 35 which locates core 31 with respect to tube 10 and cover section 18. Another spacer 36, of insulating material, is located between cover section 18 and globe section 13. A pair of screws 37 bear against globe section 13 and are threadably engaged by spacer 35 to thereby clamp globe section 13 in place and rigidly fix the coaxial and concentric relation of each part in the lower section of the apparatus as seen in FIGURE 5.

The circuit used in these detailed figures is that shown in FIGURE 2. The lamp 23 has two soldered terminals 38, 40 which are inserted through cover section 18 and are insulated by grommets 41. Terminal 38 is wired to a junction line 42 connected between rectifier unit 26 and capacitor 27. Capacitor 27 is also connected to a first terminal 43 of secondary winding 25 and to terminal 40. The remaining connection between rectifier unit 26 and a second terminal 44 of secondary winding 25 is shown as a wire 45. The rectifiers of rectifier unit 26 and capacitor 27 are packed within the space between core 31 and tube 10 by suitable insulating material, such as glass wool.

The apparatus can be easily assembled or dismantled. Lamp 23 may be of any desired shape. The configuration shown places lamp 23 in visible position from any angle of view looking at the apparatus. It is coiled about cover sections 17 and 18 without going about their diameter. In this manner, the lamp 23 or sections 17, 18 may be replaced independently without disturbing any other component. The lamp 23 may be replaced merely by releasing bolts 16 and lifting globe section 12. Terminals 38, 40 can then be broken and lamp 23 can be spiraled out from cover sections 17, 18. The upper half 17 of the cover can be removed by releasing bolts 22. Section 17 can then be shifted until it abuts core 31 and can then be lifted out from under lamp 23. The entire upper half of the assembly as seen in FIGURE 5 can be removed by releasing bolts 16, 22 and screws 34. Complete disassembly can be obtained by the further removal of screws 37. Thus replacement and repair can easily be accomplished.

The finished apparatus is shown in FIGURE 7 strung on line 11 between two towers 46. The lamp assembly presents a symmetrical appearance and produces a flickering intermittent burst of light which is readily visible. It presents little wind resistance and is fully enclosed for weather protection. No fixed connection is necessary between line 11 and the lamp 23, so that the lamp will continue to flash during movement along line 11 during a storm. There is no anchor member subjected to stress due to exterior conditions.

The foregoing general description is limited to a single practical model of the invention. Obviously both the circuits and apparatus can be modified without departing from the basic considerations which led to this invention. Therefore only the following claims are intended to limit and define the invention.

Having thus described our invention, we claim:

1. An apparatus for illuminating power lines comprising an insulating tube adapted to slidably receive a power line;
   a current transformer having a diametrically split circular core mounted coaxially about the axis of said insulating tube and having a secondary winding;
   a diametrically split spherical cover having a reflective outer surface and mounted coaxially about the axis of said insulating tube;
   a gaseous conduction lamp mounted exteriorly of said cover and electrically connected to said secondary winding by circuit means adapted to produce intermittent conduction of current by said gaseous conduction lamp;
   and a plastic globe mounted concentrically over said cover and exteriorly of said gaseous conduction lamp, said plastic globe being formed of two hemispherical elements having diametric mating flanges;
   means to secure said flanges to one another;
   and insulating spacer means mounted between said tube and said secondary winding, between said secondary winding and said cover, and between said cover and said globe, said insulating means being adapted to secure said tube, said secondary winding, said cover and said globe as a rigid concentric unit.

2. The invention as defined in claim 1 wherein said circuit means comprises an inductance coil wired in series with said gaseous conduction lamp across the terminals of said secondary winding;
   and an element of non-linear resistance material having a current conducting capacity which varies exponentially as a function of the voltage across the element terminals, the terminals of the element being wired across the terminals of the secondary winding in parallel with said inductance coil and gaseous conduction lamp.

3. The invention as defined in claim 1 wherein said circuit means comprises a rectifier unit wired in series with said gaseous conduction lamp across the terminals of said secondary winding;
   and capacitance means wired in parallel with the gaseous conduction lamp across the terminals thereof.

4. An apparatus for illuminating power lines comprising an insulating tube adapted to slidably receive a power line;
   a current transformer having a diametrically split circular core mounted coaxially about the axis of said insulating tube and having a secondary winding;
   a diametrically split spherical cover having a reflective outer surface and mounted coaxially about the axis of said insulating tube;
   a gaseous conduction lamp mounted exteriorly of said cover and electrically connected to said secondary winding by circuit means adapted to produce intermittent conduction of current by said gaseous conduction lamp;
   and a plastic globe mounted concentrically over said cover and exteriorly of said gaseous conduction lamp, said plastic globe being formed of two hemispherical elements;
   and insulating spacer means mounted between said tube and said secondary winding, between said secondary winding and said cover, and between said cover and said globe, said insulating means being adapted to secure said tube, said secondary winding, said cover and said globe as a rigid concentric unit.

(References on following page)

References Cited by the Examiner

UNITED STATES PATENTS

| | | | |
|---|---|---|---|
| 2,028,906 | 1/36 | Higgins | 340—28 |
| 2,114,865 | 4/38 | Traver | 324—119 |
| 2,129,524 | 9/38 | Camilli | 324—127 X |
| 2,146,555 | 2/39 | Arey | 324—149 |
| 2,226,154 | 12/40 | Bethenod | 340—28 |
| 2,240,955 | 5/41 | Mittelman | 324—119 X |
| 2,272,080 | 2/42 | Bethenod et al. | 340—28 |
| 2,509,815 | 5/50 | Elliott | 324—157 X |
| 2,736,001 | 2/56 | Dana et al. | 340—28 |
| 2,894,257 | 7/59 | Crooks | 340—366 |
| 2,923,917 | 2/60 | McPherson et al. | 340—27 |
| 3,046,494 | 7/62 | Root | 331—111 |
| 3,114,893 | 12/63 | Kayser et al. | 340—28 |

NEIL C. READ, *Primary Examiner.*

E. JAMES SAX, *Examiner.*